(12) United States Patent
Lupton et al.

(10) Patent No.: US 8,312,288 B2
(45) Date of Patent: Nov. 13, 2012

(54) SECURE PIN CHARACTER RETRIEVAL AND SETTING USING PIN OFFSET MASKING

(75) Inventors: Jonathan Lupton, York (GB); George S. Perkins, Hemel Hempstead (GB)

(73) Assignee: Total System Services, Inc., Columbus, GA (US)

( * ) Notice: Subject to any disclaimer, the term of this patent is extended or adjusted under 35 U.S.C. 154(b) by 327 days.

(21) Appl. No.: 12/721,839

(22) Filed: Mar. 11, 2010

(65) Prior Publication Data

US 2011/0055586 A1 Mar. 3, 2011

Related U.S. Application Data

(63) Continuation-in-part of application No. 12/553,747, filed on Sep. 3, 2009.

(51) Int. Cl.
*H04L 29/06* (2006.01)
(52) U.S. Cl. .................. 713/184; 713/193; 705/72
(58) Field of Classification Search .............. 713/184, 713/187, 193; 726/30; 705/72
See application file for complete search history.

(56) References Cited

U.S. PATENT DOCUMENTS

| | | | |
|---|---|---|---|
| 6,070,154 A | 5/2000 | Tavor et al. | |
| 2002/0002533 A1* | 1/2002 | Singhal | 705/39 |
| 2002/0123972 A1 | 9/2002 | Hodgson et al. | |
| 2007/0282756 A1 | 12/2007 | Dravenstott et al. | |
| 2008/0005039 A1 | 1/2008 | Puthupparambil et al. | |
| 2008/0147564 A1 | 6/2008 | Singhal | |
| 2008/0189214 A1 | 8/2008 | Mueller et al. | |
| 2008/0222048 A1* | 9/2008 | Higgins et al. | 705/67 |

OTHER PUBLICATIONS

International Search Report, PCT/US2009/055912, Oct. 26, 2009, pp. 1-2.

* cited by examiner

*Primary Examiner* — Justin T Darrow
(74) *Attorney, Agent, or Firm* — King & Spalding

(57) ABSTRACT

Securely disclosing a personal identification number ("PIN") associated with a financial account to an account holder and receiving a new PIN from the account holder. A PIN reveal application can interact with a hardware security module ("HSM") using a PIN offset masking process and randomly generated account data to reveal the PIN to the account holder one or more PIN characters at a time. A PIN set application also can interact the HSM using a PIN offset masking process and randomly generated account data to receive a new PIN for the account one or more PIN characters at a time. In each of the PIN reveal and PIN setting processes, less than the entirety of the PIN is stored in an unencrypted format outside of the HSM only.

22 Claims, 9 Drawing Sheets

SECURE PIN CHARACTER RETRIEVAL AND SETTING USING PIN OFFSET MASKING

RELATED PATENT APPLICATION

This non-provisional patent application is a continuation-in-part of U.S. patent application Ser. No. 12/553,747, entitled, "Secure PIN Character Retrieval and Setting," filed Sep. 3, 2009, the complete disclosure of which is hereby fully incorporated herein by reference.

TECHNICAL FIELD

The invention relates generally to payment card security, and more particularly to methods and systems for disclosing a personal identification number ("PIN") associated with a financial account to an account holder and for allowing the account holder to set or modify the PIN.

BACKGROUND

With the explosion of electronic commerce and digital personal information, facilitated by the rapid growth of the Internet, focus has been placed on the protection of financial and personal data. One element in protecting these data is encryption. Encryption is the process of converting information into an unintelligible form except to holders of a specific cryptographic key. By encrypting the information, it is protected against unauthorized disclosure.

Encryption is accomplished through a cryptographic algorithm. The algorithm is used to "lock" the information at one point and "unlock" it at another. Keys are used to lock and unlock the information. In a secret-key or symmetric key encryption, the same key is used to lock and unlock (encrypt and decrypt) the information. In public key or asymmetric key encryption, a public key is used to encrypt the information and a private key is used to decrypt the information. A key is often a numerical value. The length of the key generally determines the relative security of the key.

Many types of information use encryption. One example is the payment card industry, including credit card data and other financial information. Indeed, the credit card industry had taken great steps to ensure that financial data and transaction data is protected. For example, cardholder data must be encrypted when it is stored or transmitted over a public network. This requirement covers everything from producing the credit cards, including information stored on the magnetic strip or embedded chip on the card, to authenticating and authorizing transactions made with the card. One key piece of data that must be encrypted is a user's personal identification number (PIN).

Financial institutions employ Internet web sites to support customer transactions and account access. A customer can log into the web site and select links to navigate to web pages having content associated with the account. The customer can also complete certain transactions, such as transfers between multiple accounts and bill payments.

Financial institutions also employ interactive voice response (IVR) applications to support customer transactions. Typically, a customer will call a telephone number for the system. An automated system will provide recorded instructions to the user, such as, "for inquiries about a checking account, press 1." The customer uses the number key pad on a telephone to select menu items and enter alphanumeric data, such as an account number.

However, one option that is not available to customers using an Internet web site or an IVR application is for the customer to access a PIN or password associated with an account while providing a secure platform for the information. Current standards and best practices require that a PIN remain encrypted at all times, excepting when the PIN is in a hardware security module ("HSM") or in a PIN mailer that is mailed to the customer when the customer opens an account or requests a new PIN. If a customer forgets a PIN associated with a financial card, such as a credit or debit card, the conventional solution is to generate a new PIN and mail the new PIN to the customer in a PIN mailer. This process is expensive and leaves the card unusable until the new PIN is received by the customer. With the advent of computers and online banking, such delay is unacceptable and frustrating to the customer. This process also leads to confusion as customers frequently forget that a new PIN has been issued and continue to attempt to use the old PIN, leading to even further administrative expense.

Accordingly, systems and methods are needed to provide customers with quick and secure access to a PIN associated with a financial account. Another need exists for systems and methods for allowing an account holder to quickly set or modify the PIN.

SUMMARY

The present invention provides systems and methods for disclosing a personal identification number ("PIN") associated with a financial account to an account holder and for receiving a new PIN from the account holder. One aspect of the present invention provides a method for disclosing a PIN associated with an account. A request is received to disclose the PIN, the PIN including PIN characters encrypted in a first PIN block. Account data is generated for the account. A hardware security module ("HSM") generates a PIN offset including PIN offset characters using the account information and the PIN encrypted in the PIN block. A PIN application executing on a computer receives the PIN offset from the HSM. The PIN application modifies a portion of the PIN offset characters of the PIN offset and leaves one of the PIN offset characters unchanged. The HSM creates a second encrypted PIN block including a second PIN using the modified PIN offset and the account data. The HSM decrypts the second encrypted PIN block. A PIN character corresponding to the one unchanged PIN offset character is outputted. Certain steps in this method can be repeated for each PIN character and the PIN application can delete the previously decrypted PIN block prior to decrypting another PIN block.

Another aspect of the invention provides a system for disclosing at least one element of a PIN associated with a transaction account. A user interface can process a request for disclosure of a portion of the PIN in an unencrypted form, the PIN including PIN characters stored in an encrypted data element. A PIN module logically coupled to the user interface and to an HSM can interact with the HSM to decrypt the portion of the PIN by applying a PIN mask to the portion of the PIN and randomly generated account information to generate the decrypted portion of the PIN for presentation via the user interface.

Another aspect of the present invention provides a method for setting a PIN of an account. A user interface is provided for a user to enter a PIN character for including in the PIN. A PIN application operating on a computer receives the PIN character. The PIN application appends one or more PIN characters to the received PIN character to create a second PIN. Random account data is generated. A secure platform logically coupled to the PIN application creates a PIN offset using the second PIN and the random account data. The aforementioned steps of this method can be repeated for each PIN character of the PIN. The PIN application creates a combined offset using each of the generated PIN offsets. The secure platform creates an encrypted PIN block using information associated with the account, the random account data, and the combined PIN offset.

These and other aspects, objects, features, and embodiments of the invention will become apparent to a person of ordinary skill in the art upon consideration of the following detailed description of illustrative embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description, in conjunction with the accompanying figures briefly described as follows.

DETAILED DESCRIPTION OF EXEMPLARY EMBODIMENTS

Exemplary embodiments of the present invention are provided. These embodiments include systems and methods for securely disclosing a personal identification number ("PIN") associated with a financial account to an account holder and for receiving a new PIN from the account holder. A PIN reveal application can interact with a hardware security module ("HSM") using a PIN offset masking process and randomly generated account data to reveal the PIN to the account holder one or more PIN characters at a time. A PIN set application also can interact the HSM using a PIN offset masking process and randomly generated account data to receive a new PIN for the account one or more PIN characters at a time. In each of the PIN reveal and PIN setting processes, less than the entirety of the PIN is stored in an unencrypted format outside of the HSM only.

The invention can include one or more computer programs that embody the functions described herein and illustrated in the appended flow charts. However, it should be apparent that there could be many different ways of implementing aspects of the invention in computer programming, and these aspects of the invention should not be construed as limited to any one set of computer instructions. Further, a skilled programmer would be able to write such computer programs to implement an embodiment of the disclosed invention based on the flow charts and associated description in the application text. Therefore, disclosure of a particular set of program code instructions is not considered necessary for an adequate understanding of how to make and use the invention. The inventive functionality of the claimed invention will be explained in more detail in the following description read in conjunction with the figures illustrating the program flow. Further, those skilled in the art will appreciate that one or more stages described may be performed by hardware, software, or a combination thereof, as may be embodied in one or more computing systems.

Figure 1:
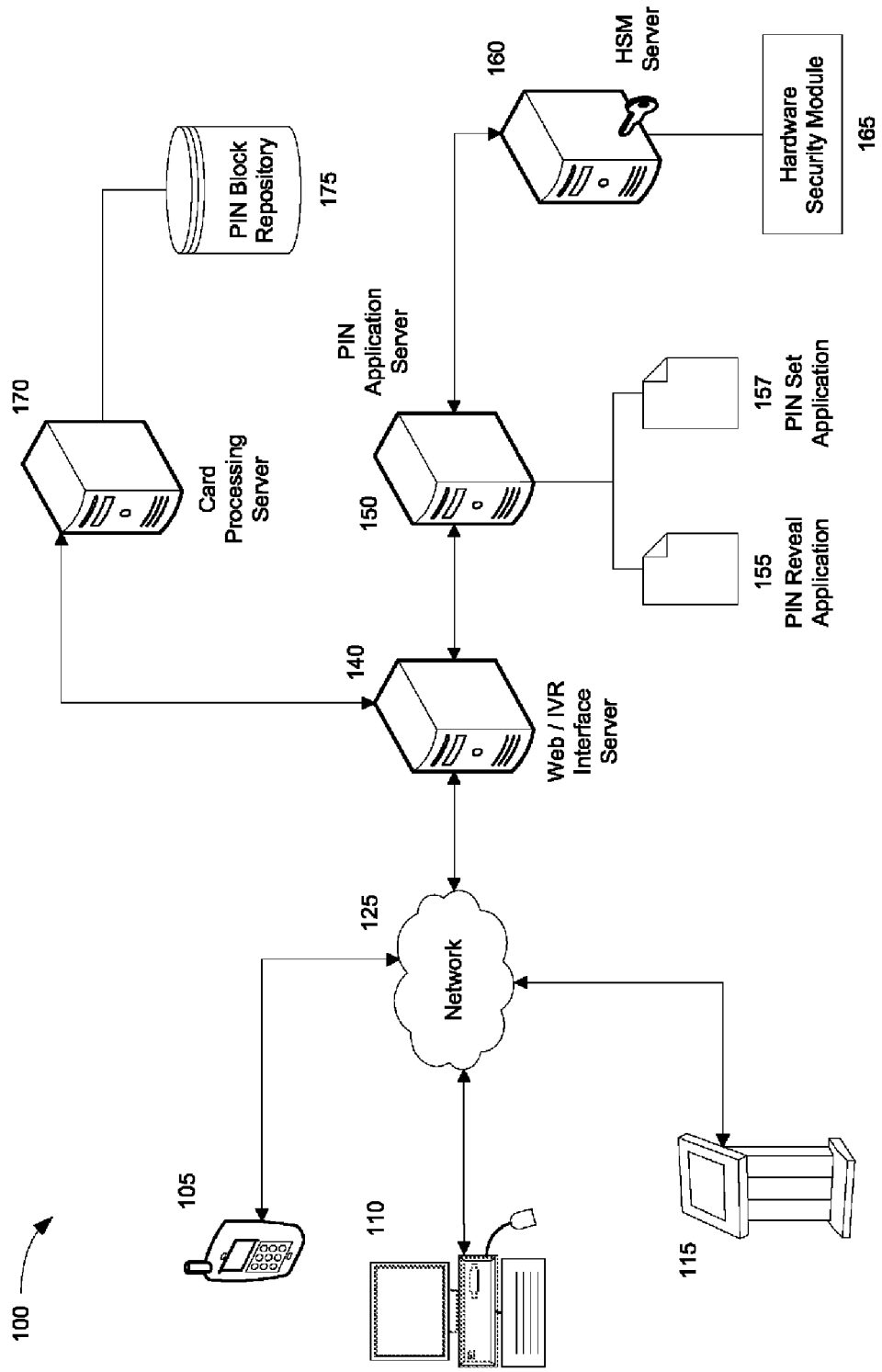
FIG. 1 is a block diagram depicting a system architecture in accordance with certain exemplary embodiments.

Turning now to the drawings, in which like numerals indicate like elements throughout the figures, aspects of the exemplary embodiments are described in detail. FIG. 1 is a block diagram depicting a system architecture 100 in accordance with certain exemplary embodiments. Referring to FIG. 1, the system architecture 100 includes a PIN application server 150 having a PIN reveal application 155 and a PIN set application 157. The PIN applications 155 and 157 are typically implemented by software modules that reside in a computer-readable memory storage device of a programmed computing device (e.g., PIN application server 150) and can be executed by a processor via computer readable memory. The PIN applications 155 and 157 can comprise application programming interfaces ("APIs") that interact with a user, such as an account holder, via a user interface provided by a Web/IVR interface server 140. The user interface can be provided by the Web/IVR interface server 140 to a user device, such as mobile phone 105, computer 110, or kiosk 115. The PIN applications 155 and 157 can also interact with one or more HSMs, such as HSM 165 that the PIN application server 150 is connected to.

The HSM 165 is typically implemented as a combination of hardware and software modules embodied in a HSM server 160 having a computer readable storage medium for storing the software modules and a processor for executing the software modules. In certain exemplary embodiments, the HSM 165 may be embodied as software alone. The HSM 165 provides a secure platform to generate, store, and protect cryptographic keys. The HSM 165 component provides a secure platform to encrypt and decrypt account holder information, such as a PIN. The HSM 165 can include software code or hardware modules that allow the HSM to interact with the PIN reveal application 155 and the PIN set application 157.

The PIN reveal application 155 securely provides an account holder with a PIN associated with an account of the account holder. Current standards and best practices require that PINs associated with financial accounts are stored at a payment processor, such as card processing server 170, in an encrypted form. Typically, these PINs are stored in encrypted PIN blocks that can also include other account related information. The PINs, in their entirety, must remain encrypted at all times, excepting when the PIN is stored in an HSM 165 or in a PIN mailer that is mailed to the account holder. The PIN reveal application 155 provides a means for disclosing a PIN to an account holder by storing only a portion (typically, one PIN character) of the PIN in a decrypted format at a given time and disclosing only that portion to the account holder.

The portion of PIN characters disclosed at a given time can include any number of PIN characters less than the entirety of the PIN to remain compliant. In certain exemplary embodiments, the PIN reveal application 155 operates to reveal the entire PIN, one PIN character at a time. In certain exemplary embodiments, the PIN reveal application 155 operates to reveal only a portion of the entire PIN, one character at time. For example, the PIN reveal application 155 may operate as a "memory jogger" by only revealing up to the first two or three characters of the PIN, one character at a time. Although conventional financial account PINs typically include four numerical PIN characters, the PIN reveal application 155 can be adapted to reveal PINs having any number of characters or symbols and is not limited to just numerical characters. The PIN reveal application 155 is described in more detail below with reference to FIG. 2.

The PIN set application 157 allows an account holder to set or modify a PIN associated with an account. The PIN set application 157 can interact with the user via a user interface provided by the Web/IVR interface server 140 to receive a PIN from the account holder one or more characters at a time. The PIN set application 157 can also interact with the HSM 165 to encrypt the PIN into an encrypted PIN block and send the encrypted PIN block to the card processing server 170 for storage in the PIN block repository 175. The PIN set application 157 is described in more detail below with reference to FIG. 3.

The Web/IVR interface server 140 is connected to a network 125, such as the Internet or a telephone network. The Web/IVR interface server 140 provides secure access between an account holder and a financial account, such as a bank account or credit card account. The Web/IVR interface server 140 can include a web server application (not shown) that provides a user interface to the account holder in the form of an Internet web site (not shown). The web site can be provided via the network 125 (e.g., the Internet) to a user device having a web browser, such as mobile phone 105, computer 110, kiosk 115, or any other device having a web browser. The web site can provide secure access using a secure cryptographic network communication protocol, such as transport layer security ("TLS") or secure sockets layer ("SSL") protocols or the like. The PIN reveal application 155 and the PIN set application 157 can interact with the web site to provide a PIN to or receive a PIN from the account holder in a secure manner.

Additionally, or alternatively, the Web/IVR interface server 140 can include an IVR application (not shown) that provides an automated user interface to the account holder via a telephone, such a mobile phone 105, or a conventional touch-tone telephone (not shown). The IVR application can solicit information (e.g., account number, password, etc.) and requests (e.g., available balance) from the account holder, typically by using a pre-recorded audio based menu. The IVR application can receive information and requests from the account holder in the form of speech or telephone touchtone keypad entries and decode this speech or tones representing the keypad entries. The IVR application can respond to requests using pre-recorded audio or a speech synthesizing application (not shown). In an IVR embodiment, the network 125 can comprise a cellular telephone network, a public-switched telephone network, the Internet (e.g., voice over Internet protocol) or any other telephone network. The PIN reveal application 155 and the PIN set application 157 can interact with the IVR application to provide a PIN to or receive a PIN from the account holder in a secure manner.

The Web/IVR server 140 is connected to the card processing server 170. The card processing server 170 supports financial transactions involving an account for an account holder. For example, the card processing server 170 may authorize transactions for an account, such as a debit card account linked to a specific bank account, a pre-paid debit card, a credit card, or a retail card. Part of this process may be to verify a PIN supplied by an account holder in connection with a transaction. These cards may have a specific PIN or other security feature.

The card processing server 170 can store information associated with financial accounts, such as account number, balance, transaction history, or any other account information that may be used to authorize transactions or that an account holder may request. As discussed above, the card processing server 170 can also store a PIN for the account in a PIN block repository 175. For security purposes, the PIN can be stored in an encrypted PIN block. Typically, the PIN block includes the PIN and at least a portion of the account number.

Although the Web/IVR interface server 140, the PIN application server 150, the HSM server 160, and the card processing server 170 are illustrated in FIG. 1 and described herein as being servers, one skilled in the art would appreciate that these servers could be embodied as various other types of computing devices, such as workstation and mainframe computers. Additionally, the connections between these servers may be implemented using a computer network, such as a local area network ("LAN") or a wide area network ("WAN").

Figure 2:
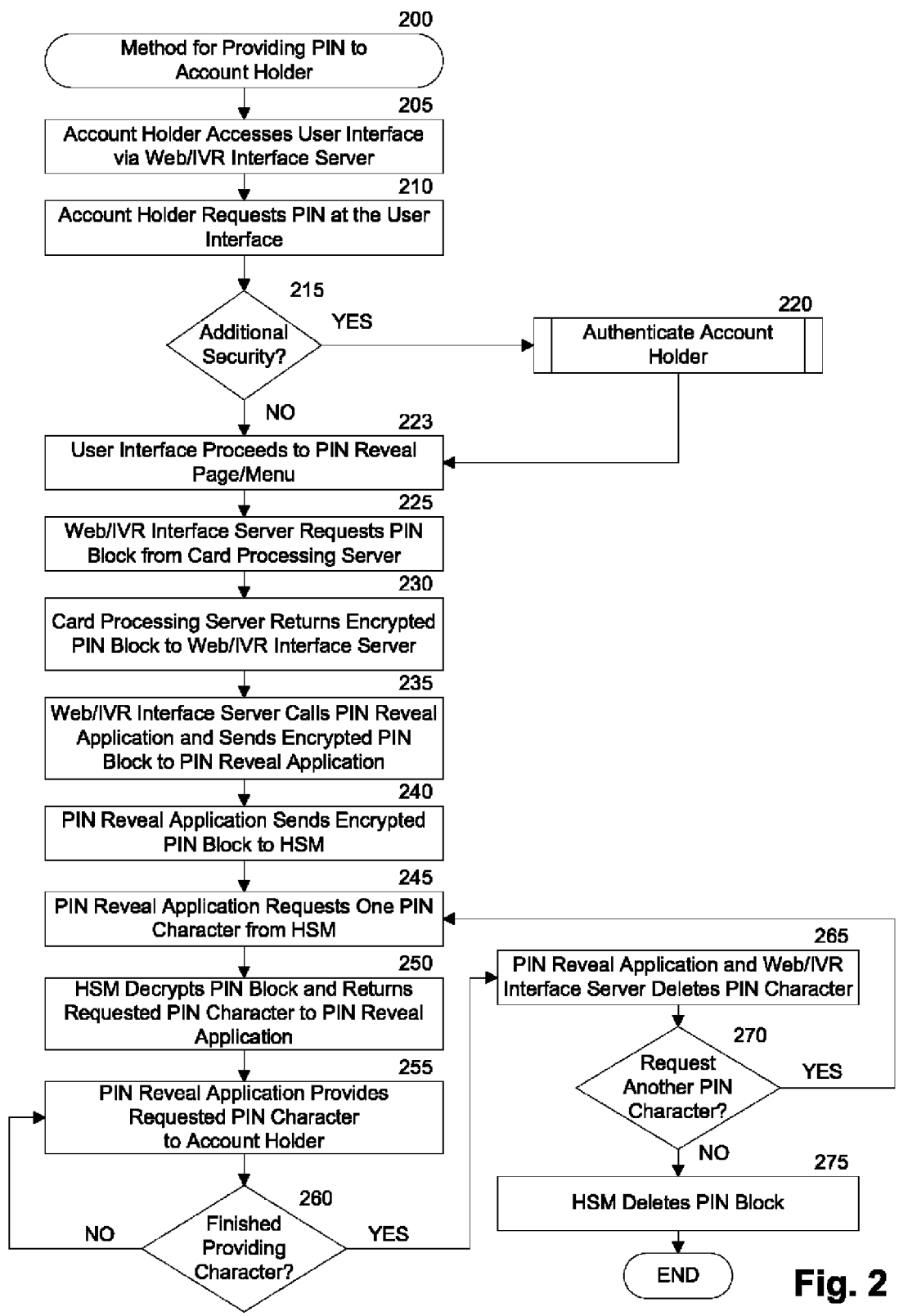
FIG. 2 is a process flow diagram depicting a method for providing an account holder with a personal identification number ("PIN") associated with an account in accordance with certain exemplary embodiments.

FIG. 2 is a process flow diagram depicting a method 200 for providing an account holder with a PIN associated with an account in accordance with certain exemplary embodiments. Referring to FIGS. 1 and 2, in step 205, the account holder accesses a user interface provided by a Web/IVR interface server 140. In an Internet web site embodiment, the account holder may navigate to an Internet web site hosted or otherwise provided by the Web/IVR interface server 140 using a web browser executing on a user device, such as computer 110. The web site may prompt the account holder to log into the web site using a user name and password or other information to authenticate the account holder. In an IVR embodiment, the account holder may call a telephone number associated with the Web/IVR interface server 140 using a telephone, such as mobile phone 105. An IVR application executing on the Web/IVR interface 140 can receive the call and provide a pre-recorded message prompting the account holder for account information for authentication. The Web/IVR interface server 140 can use information provided by the account holder to authenticate the account holder prior to providing account information at the user interface. Alternatively, the Web/IVR interface server 140 may provide the information to another computer or server, such as card processing server 170, to complete the authentication.

In step 210, the account holder makes a request at the user interface to view or hear a PIN associated with an account, such as a financial account. In an Internet web site embodiment, the account holder may use a pointing device to click on a link or tab displayed on a web page associated with the account. In an IVR embodiment, the account holder may press a key pad on the mobile phone 105 that corresponds with a "Request PIN" selection.

In step 215, the Web/IVR interface server 140 determines whether any additional security measures are required for the account holder to receive the PIN. This determination can be based on a status of the account holder or on the type of account that the PIN is associated with. Alternatively, all account holders and all account types may require additional security. If additional security is required, the method 200 proceeds to step 220. If no additional security is required, the method proceeds to step 223.

In step 220, the account holder is authenticated based on the additional security measures. The user interface may prompt the account holder for additional security information, such as a card verification value ("CVV") number printed on a card associated with the account. The Web/IVR interface server 140 may then compare information received from the account holder to account information stored at the Web/IVR interface server 140 to authenticate the account holder. Alternatively, the Web/IVR interface server 140 may send the information to a card processing server 170 for authentication. Step 220 is described in more detail below with reference to FIG. 4.

In step 223, the user interface proceeds to a secure Internet web page in an Internet embodiment or to a PIN reveal menu in an IVR embodiment. In an Internet embodiment, the web page for revealing a PIN to the account holder may include masked characters corresponding to characters of the PIN. The account holder can select the PIN characters to request that that PIN character be displayed on the web site. In an IVR embodiment, the PIN reveal menu may prompt the user to select which PIN character to reveal using a telephone keypad.

In step 225, the Web/IVR interface server 140 requests an encrypted PIN block for the account from a card processing server 170 that stores the PIN block. In certain exemplary embodiments, whereby the card processing server 170 authenticates the account holder, the Web/IVR interface server 140 may send a request for the encrypted PIN block with the additional security information obtained in step 220 to the card processing server 170. Thus, the Web/IVR interface server 140 does not have to send two separate requests to the card processing server 170 to obtain the PIN block.

In step 230, the card processing server 170 sends the PIN block to the Web/IVR interface server 140. In step 235, the Web/IVR interface server 140 makes a call to a PIN reveal application 155 at a PIN application server 150 and sends the PIN block to the PIN reveal application 155.

In step 240, the PIN reveal application 155 sends the PIN block to an HSM 165 at an HSM server 160 and the HSM 165 stores the PIN block in memory.

In step 245, the PIN reveal application 155 requests one character of the PIN from the HSM 165. In certain exemplary embodiments, the requested character may be based on an input received at the user interface from the account holder. For example, with reference to an exemplary screen image of a user interface 500 provided in FIG. 5, each PIN character 510A-510D may initially be masked using an asterisk or other symbol. The account holder can use a mouse or other pointing device to move a cursor 515 and select (e.g., click on or hover over) one of the masked characters to generate a request for that PIN character. In the screen image, the account holder has selected the first PIN character 510A having a value of 5. The other PIN characters 510B-510D remain masked.

In IVR embodiments, the account holder can request a PIN character by pressing a key on a telephone keypad corresponding to one of the PIN characters. For example, the IVR may prompt the account holder to select PIN character one by pressing a "1" key on the telephone keypad.

In certain embodiments, the PIN characters may not be selectable by the user. Instead, the PIN characters may be requested from the HSM 165 sequentially.

In step 250, the HSM 165 decrypts the PIN block and returns the one requested PIN character to the PIN reveal application 155. That is, the decryption takes place on a secure platform. In step 255, the PIN reveal application 155 provides the received PIN character to the Web/IVR interface server 140 and the user interface of the Web/IVR interface server 140 reveals the PIN character to the account holder. In an Internet embodiment, the PIN character may be displayed on a web page. In an IVR embodiment, the PIN character may be communicated to the account holder using a pre-recorded message.

In step 260, the Web/IVR interface server 140 determines whether to stop providing the PIN character to the account holder. Continuing the Internet example from step 245, if the account holder deselects the PIN character 510A, the web page can re-mask the PIN character 510A. The Web/IVR interface server 140 can also determine to stop providing the PIN character based on a time period. For example, the Web/IVR interface server 140 can stop providing the PIN character based on a period of inactivity. In an IVR embodiment, the PIN character may be verbalized a single time. If the Web/IVR interface server 140 determines to stop providing the PIN character, the method 200 proceeds to step 265. Otherwise, the method 200 returns to step 255 to continue providing the PIN character.

In step 265, the PIN reveal application 155 and the Web/IVR interface server 140 delete the previously displayed (or verbalized) PIN character. The PIN character can be deleted at both servers by overwriting memory used to temporarily store the PIN character with random data or by any other suitable means for clearing computer memory.

In step 270, the PIN reveal application 155 determines whether to request another PIN character from the HSM 165. For example, the account holder may request each PIN character, one at a time, until the entire PIN has been revealed via the user interface, one character at a time. Or, in the alternative, the PIN reveal application 155 may operate to request the remaining PIN characters in sequential fashion until each character is presented via the user interface, one character at a time. In another example, the PIN reveal application 155 may limit the account holder to retrieving a portion of the entire PIN only, such as the first two PIN characters, one character at a time. If another PIN character is requested, the method 200 returns to step 245. Otherwise, the method 200 proceeds to step 275.

In step 275, the HSM 165 deletes the PIN block from memory. Although this step is not necessary for security or compliance purposes, the HSM 165 can free the memory for other purposes. After step 275, the method 200 ends. Of course, the Web/IVR interface server 140 may continue to interact with the account holder as necessary to complete the account holder's service.

Although the method 200 for providing an account holder with a PIN has been described in terms of presenting an account holder with a PIN, one character at a time, the method 200 can be adapted to present more than one PIN character at a time. For example, conventional financial account PINs typically include four numerical characters. Based on current standards and best practices prohibiting the storage of a decrypted PIN in its entirety outside of an HSM 165 or a PIN mailer, the method 200 could be adapted to present one, two, or three of the four PIN characters at a time via the user interface. However, displaying multiple characters can present security risks. For example, if a "hacker" or packet sniffing program somehow gains access to the communication between the PIN reveal application 155 and the user interface, the hacker could access half or more of the account holder's PIN leaving only one or two PIN characters to resolve. If the PIN comprises a common pattern, such as "1-2-3-4" and the characters 1 and 2 are revealed, the hacker could easily determine the remaining PIN characters.

Figure 3:
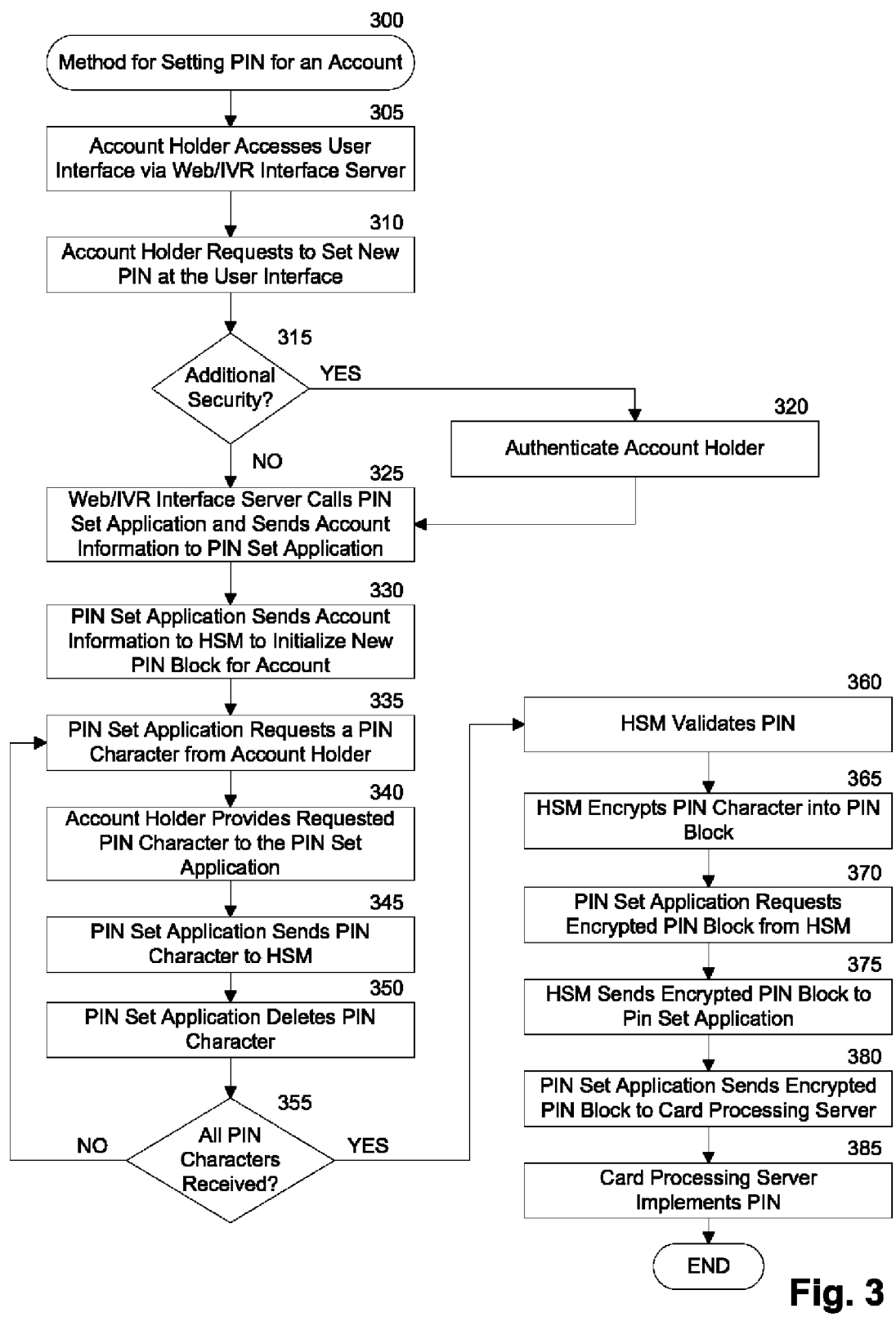
FIG. 3 is a process flow diagram depicting a method for setting a PIN for an account by the account holder in accordance with certain exemplary embodiments.

FIG. 3 is a process flow diagram depicting a method 300 for setting a PIN for an account by the account holder in accordance with certain exemplary embodiments. Referring to FIGS. 1 and 3, in step 305, the account holder accesses a user interface provided by a Web/IVR interface server 140. This step 305 can be substantially similar to that of step 205 discussed above with reference to FIG. 2.

In step 310, the account holder makes a request at the user interface to set or modify a PIN associated with an account, such as a financial account. In an Internet web site embodiment, the account holder may use a pointing device to click on a link or tab displayed on a web page associated with the account. For example, the account holder may use a mouse coupled to computer 110 to click the link or tab. In an IVR embodiment, the account holder may press a key pad on mobile phone 105 that corresponds with a "Set PIN" selection.

In step 315, the Web/IVR interface server 140 determines whether any additional security measures are required for the account holder to receive the PIN. This determination can be based on a status of the account holder or on the type of account that the PIN is associated with. Alternatively, all account holders and all account types may require additional security. If additional security is required, the method 300 proceeds to step 320. If no additional security is required, the method proceeds to step 325.

In step 320, the account holder is authenticated based on the additional security measures. The user interface may prompt the account holder for additional security information, such as a CVV number printed on a card associated with the account. The Web/IVR interface server 140 may then compare information received from the account holder to account information stored at the Web/IVR interface server 140 to authenticate the account holder. Alternatively, the Web/IVR interface server 140 may send the information to a card processing server 170 for authentication. Step 320 may be substantially similar to that of step 220 described in detail below with reference to FIG. 4.

In step 325, the Web/IVR interface server 140 makes a call to a PIN set application 157 at a PIN application server 150 and sends account information to the PIN set application 157. The account information can include any information that is included in a PIN block, such as an account number associated with the account. The account information may be stored at the Web/IVR interface server 140. Alternatively, the account information may be stored at a card processing server 170 and the Web/IVR interface server 140 may retrieve the account information from the card processing server 170 prior to sending the account information to the PIN set application 157.

In step 330, the PIN set application 157 sends the account information to an HSM 165 at an HSM server 160 along with a request to initialize a new PIN block for the account. The HSM 165 creates a new PIN block for the account and waits for PIN characters from the PIN set application 157.

In step 335, the PIN set application 157 calls the user interface of the Web/IVR interface server 140 to prompt the account holder for a PIN character. In an Internet embodiment, an Internet web site provided by the Web/IVR interface server 140 may provide a web page having a text entry box for entering a PIN character. In an IVR embodiment, an IVR application at the Web/IVR interface server 140 may prompt the account holder for a PIN character using a pre-recorded message.

In step 340, the account holder provides the PIN set application 157 with a PIN character via the user interface of the Web/IVR interface server 140. In the Internet embodiment of step 335, the account holder can enter a character into the text entry box using a keyboard coupled to the computer 110. In the IVR embodiment of step 335, the account holder can press a key on a mobile phone 105 keypad corresponding to the PIN character that the account holder selects.

In step 345, the PIN set application 157 receives the PIN character from the user interface and sends the received PIN character to the HSM 165. After sending the PIN character to the HSM 165, in step 350, the PIN set application 157 deletes the PIN character. In certain exemplary embodiments, the PIN set application 157 immediately deletes the PIN character after sending to the HSM.

In step 355, the PIN set application 157 determines if all PIN characters have been received by the HSM 165. If all PIN characters have been received, the method 300 proceeds to step 360. If there are additional PIN characters that are required from the account holder, the method returns to step 335 to request another PIN character.

In step 360, the HSM 165 validates the received PIN comprising the received PIN characters. That is, the HSM 165 determines if the PIN is a weak PIN or a strong PIN. This validation may be completed by comparing the received PIN to a list of PINs that are identified as "weak PINS." For example, the PIN "1-2-3-4" may be classified as "weak." The HSM 165 may then send a message to the PIN set application 157 to request that the account holder provide a new PIN. This validation step necessarily takes place before the PIN is encrypted. By having the HSM 165 perform this validation, the PIN is stored at a secure location, rather than on a server that could be vulnerable to security breaches.

In step 365, the HSM 165 encrypts the PIN characters into the PIN block created in step 330. That is, the encryption takes place on a secure platform. The HSM 165 may also encrypt the account information into the PIN block.

In step 370, the PIN set application 157 requests the encrypted PIN block from the HSM 165. In step 375, the HSM 165 sends the encrypted PIN block to the PIN set application 157. In step 380, the PIN set application 157 sends the encrypted PIN block to the card processing server 170 and the card processing server 170 stores the encrypted PIN block in a PIN block repository 175. In step 385, the card processing server 170 implements the new PIN contained in the received PIN block. Thus, the card processing server 170 will reference the new PIN when processing transactions involving the account. After step 385, the method 300 ends. Of course, the Web/IVR interface server 140 may continue to interact with the account holder as necessary to complete the account holder's service.

Figure 4:
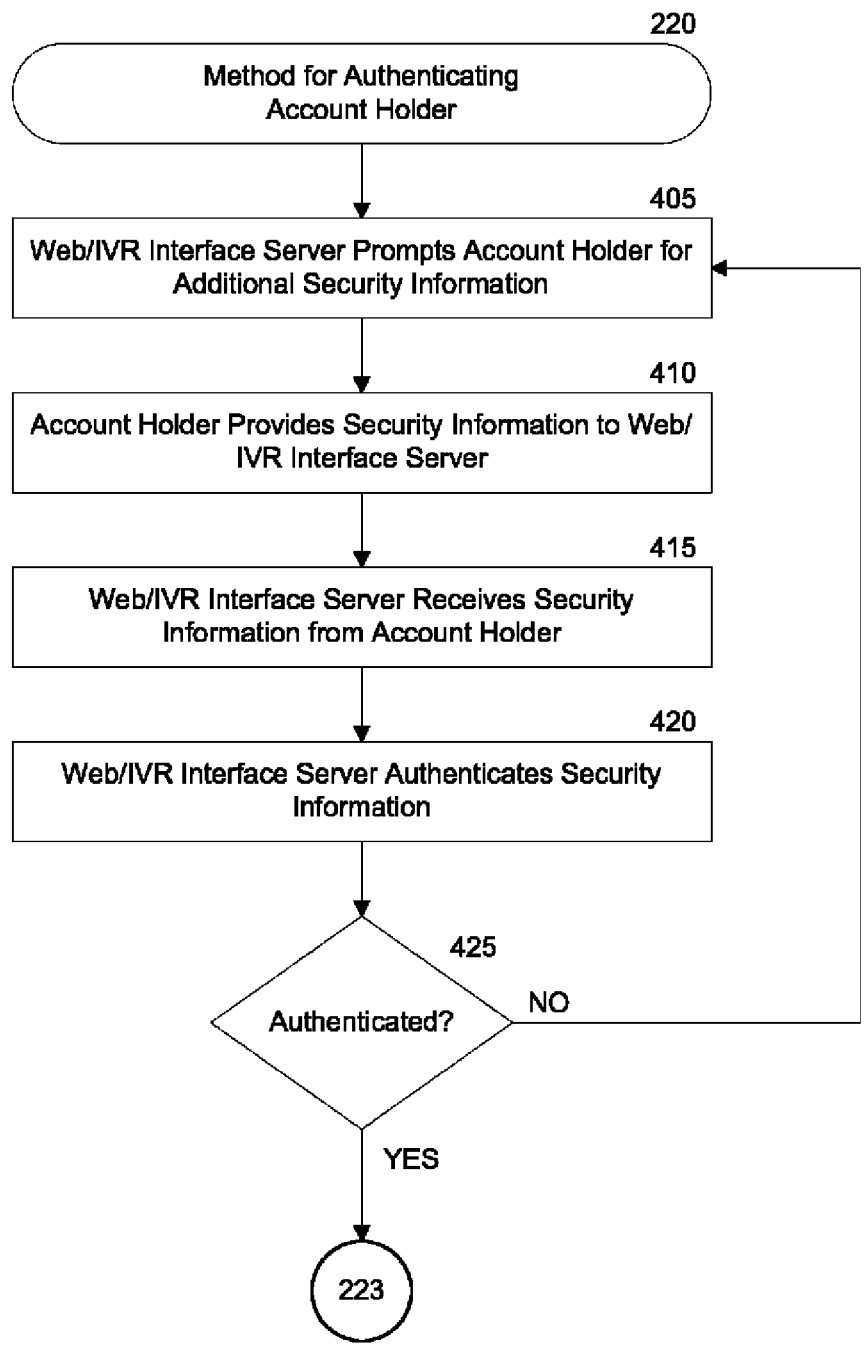
FIG. 4 is a process flow diagram depicting a method for authenticating an account holder in accordance with certain exemplary embodiments.

FIG. 4 is a process flow diagram depicting a method 220 for authenticating an account holder in accordance with certain exemplary embodiments. Referring to FIGS. 1 and 4, in step 405, a user interface of Web/IVR interface server 140 prompts an account holder for additional security information. This additional security information can include any information that can be used to authenticate the account holder, such as, for example, a CVV code on a card associated with the account, an expiration date of the card, the account holder's social security number, or the account holder's mother's maiden name.

In step 410, the account holder provides the user interface with the requested information and in step 415, the requested information is received at the Web/IVR interface server 140. In step 420, the Web/IVR interface server 140 authenticates the account holder using the received additional security information. In certain exemplary embodiments, the Web/IVR interface server 140 authenticates the account holder by comparing the received additional security information to account information stored at the Web/IVR interface server 140. In certain embodiments, the Web/IVR interface server 140 sends the received additional security information to a card processing server 170 or other computing system to authenticate the user. The card processing server 170 can send a message to the Web/IVR interface 170 indicating whether the account holder is authenticated.

In step 425, if the account holder is authenticated, the method 220 proceeds to step 223 of FIG. 2. If the account holder is not authenticated, the method 220 returns to step 405 to prompt the account holder to re-enter additional security information. In certain exemplary embodiments, the account holder may be limited to a certain number of attempts to be authenticated by the Web/IVR interface server 140. For example, after three unsuccessful attempts, the account that the account holder is attempting to access may be "frozen" until the account holder can verify their identity.

Figure 5:
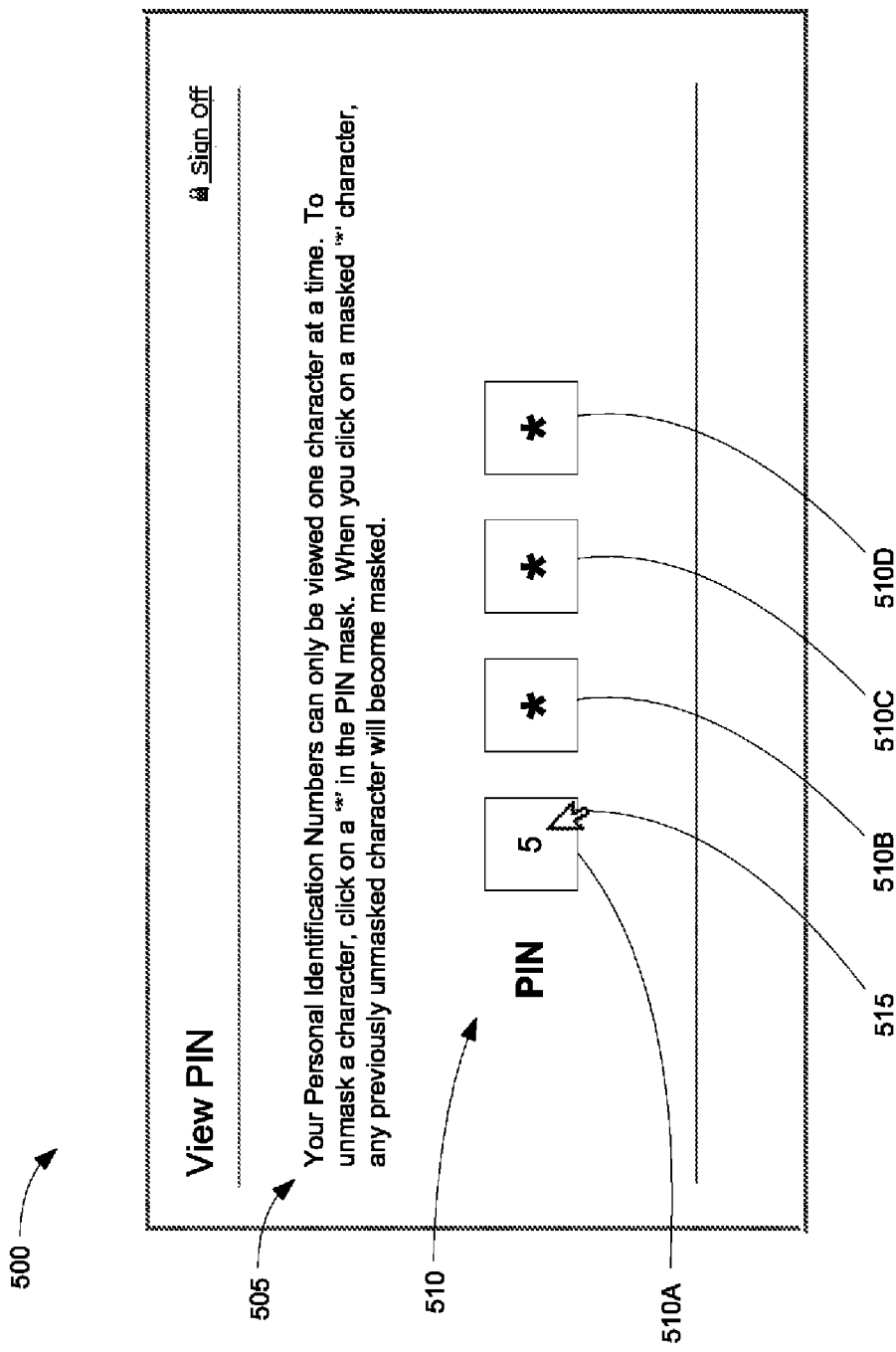
FIG. 5 depicts a screen image of a user interface in accordance with certain exemplary embodiments.

FIG. 5 depicts a screen image of a user interface 500 in accordance with certain exemplary embodiments. Referring to FIGS. 1 and 5, the user interface 500 may be embodied in a web browser executing on a user device, such as mobile phone 105, computer 110, kiosk 115, or any other device having a web browser. Alternatively, the exemplary user interface 500 may be embodied in another software application other than a web browser, such as a financial software program or dedicated PIN administrative software package.

The user interface 500 includes instructions 505 to direct an account holder as to how to access a PIN 510 associated with an account. Although in this exemplary embodiment, the PIN includes 4 PIN characters 510A-510D, one skilled in the art would appreciate that the user interface 500 could be configured to support PINs having any number of characters. In this screen image of the user interface 500, the account holder has placed a cursor 515 over the PIN character 510A and clicked a pointing device, such as a mouse coupled to computer 110, to reveal the PIN character 510A. The remaining PIN characters 510B-510D are masked using an asterisk. If the account holder deselects the PIN character 510A, the PIN character 510A would also become masked. The account holder could then select another PIN character, such as PIN character 510B, to reveal that PIN character.

Figure 6:
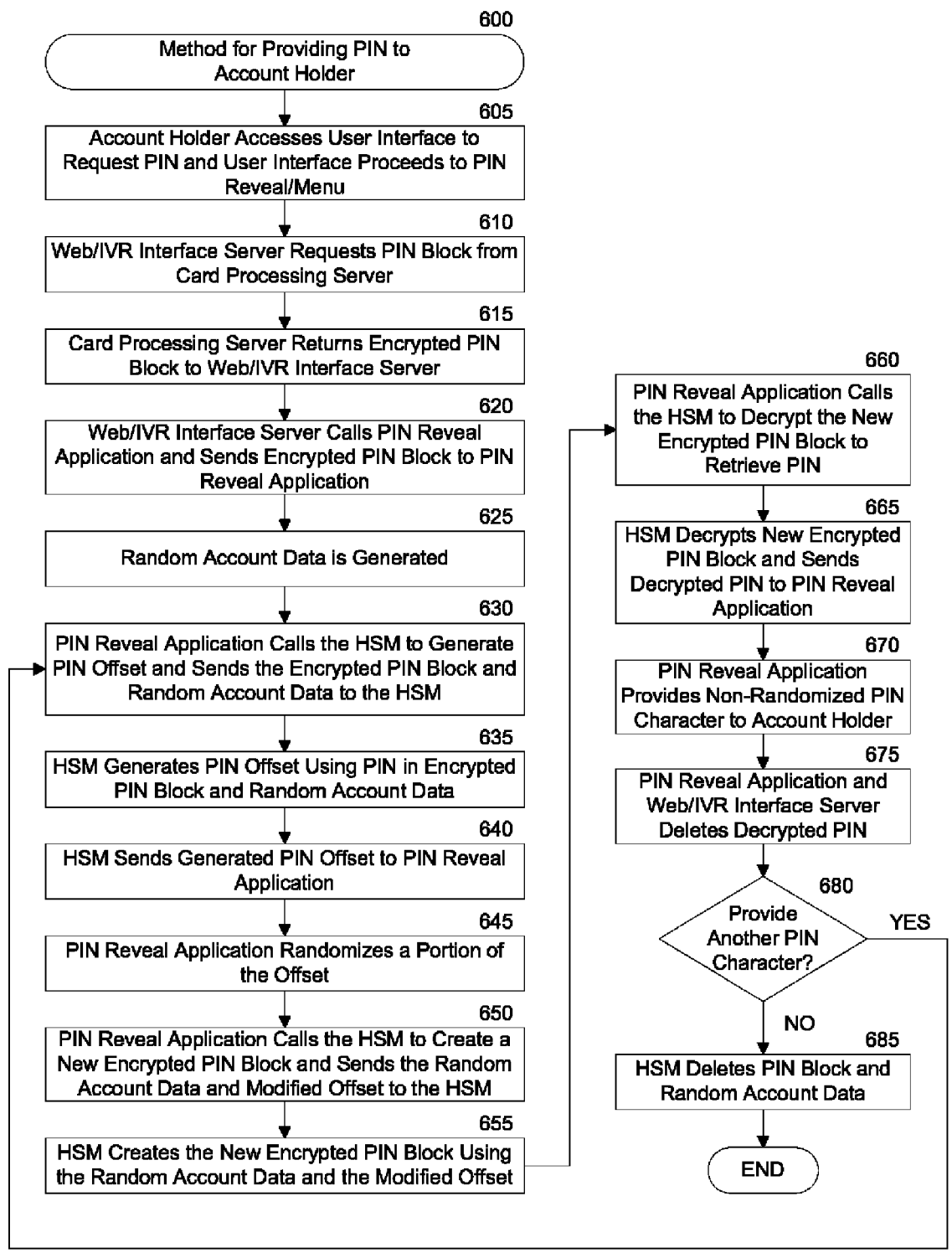
FIG. 6 is a process flow diagram depicting a method for providing an account holder with a PIN associated with an account in accordance with certain exemplary embodiments.

FIG. 6 is a process flow diagram depicting a method 600 for providing an account holder with a PIN associated with an account in accordance with certain exemplary embodiments. The method 600 is an alternative method to that of method 200 illustrated in FIG. 2 and described above. This method 600 uses a PIN offset mask that allows an account holder to securely access their PIN one or more PIN characters at a time without storing or disclosing a decrypted version of the entire PIN outside of an HSM 165. The offset masking technique described below is a novel process that includes calls that certain conventional HSMs are capable of performing without the need for any modifications to the HSMs.

A PIN can be stored in an encrypted PIN block as an offset to a natural PIN rather than storing the actual characters that make up the PIN. Typically, the natural PIN is based on an account number or card number associated with a financial account and is determined by encrypting the account or card number using a key. The PIN offset is the difference between a PIN that the account holder selects and the natural PIN associated with the account. For example, a natural PIN for an account may be '1234' and the account holder may select '4689' as their PIN for the account. In this example, the PIN offset is the difference between '4689' and '1234', '3455'.

The method 600 described below uses conventional calls to an HSM 165 and a PIN offset masking technique to decrypt one or more characters of a PIN at a time and provide the decrypted characters to the account holder. For clarity of subsequent description, the method 600 is described in terms of providing a PIN to an account holder one PIN character at a time. One skilled in the art having the benefit of the present disclosure would appreciate that the method 600 could be used to provide more than one PIN character simultaneously to the account holder. However, as described above, current standards and best practices prohibiting the storage of a decrypted PIN in its entirety outside of an HSM 165 or a PIN mailer and providing more than one PIN character at a time presents additional security risks.

Referring to FIGS. 1 and 6, in step 605, an account holder accesses a user interface provided by the Web/IVR interface server 140 and navigates to a PIN reveal web page or IVR menu to obtain one or more characters of a PIN associated with an account of the account holder. Step 605 may be substantially similar to that of steps 205 through 223 of FIG. 2.

In step 610, the Web/IVR interface server 140 requests an encrypted PIN block that stores the PIN offset for the account holder's account from a card processing server 170. In step 615, the card processing server 170 sends the PIN block to the Web/IVR interface server 140. In step 620, the Web/IVR interface server 140 makes a call to a PIN reveal application 155 at a PIN application server 150 to provide the one or more PIN characters to the account holder and sends the PIN block to the PIN reveal application 155.

In step 625, random or pseudo-random account data is generated. This random account data can include a card number for a payment card associated with the account, such as a sixteen digit credit card number, an expiration date for the payment card, and any other account data. A payment card can be any type of card associated with a payment account, including a debit card, credit card, pre-paid gift card, stored-value card, fleet card, department store card, or can simply be an account number, where a physical card is not used. In certain exemplary embodiments, the PIN reveal application 155 or another application running on the PIN application server 150 generates random account data for each session of an account holder accessing their PIN. In certain alternative embodiments, the HSM 165 generates one or more sets of random account data for use by the PIN reveal application 155.

In step 630, the PIN reveal application 155 makes a call to the HSM 165 to generate a PIN offset using the encrypted PIN block received in step 620 and the random account data generated in step 625. In step 635, the HSM 165 generates the new PIN offset using the encrypted PIN block and the random account data. To generate the new PIN offset, the HSM 165 can first determine the account holder's PIN by decrypting the encrypted PIN block. The HSM 165 can then determine a natural PIN for the random account data and calculate the new PIN offset using the account holder's PIN and the natural PIN for the random account data.

In step 640, the HSM 165 sends the generated PIN offset to the PIN reveal application 155. In step 645, the PIN reveal application 155 randomizes a portion of the generated PIN offset. In this exemplary embodiment where the PIN is provided to the account holder one PIN character at a time, each offset character except the one offset character corresponding to the PIN character to be provided to the account holder is randomized. This one offset character corresponding to the PIN character to be provided to the account holder is left unchanged. For example, if the account holder's PIN has four characters and the PIN reveal application 155 is working to provide the first PIN character to the account holder, the PIN reveal application 155 leaves the first character of the generated PIN offset unchanged and randomizes the other three PIN offset characters.

In step 650, the PIN reveal application 155 calls the HSM 165 to create a new encrypted PIN block using the random account data and the modified PIN offset having the one unchanged PIN offset character and the randomized PIN offset characters and sends the random account data and the modified PIN offset to the HSM 165. In step 655, the HSM 165 creates a new encrypted PIN block using the random account data and the modified PIN offset.

In step 660, the PIN reveal application 155 calls the HSM 165 to decrypt the new encrypted PIN block to determine the PIN corresponding to the modified PIN offset and the random account data. In step 665, the HSM 165 decrypts the new encrypted PIN block and sends the decrypted PIN to the PIN reveal application 155. This decrypted PIN includes the one PIN character from the account holder's actual PIN and random characters for each other PIN character. Continuing the example described in step 645, if the first of the four PIN characters is to be provided to the account holder in this iteration, the first PIN character in the decrypted PIN would match the account holder's actual PIN whereas the other three PIN characters are random. Thus, less than the entirety of the account holder's PIN is decrypted.

In step 670, the PIN reveal application 155 extracts the one PIN character corresponding to the PIN offset character left unchanged in step 645. The PIN reveal application 155 then provides this PIN character to the Web/IVR interface server 140 and the user interface of the Web/IVR interface server 140 provides the PIN character to the account holder. Similar to the method 200 of FIG. 2, the PIN character can be displayed on a web page in an Internet embodiment or communicated using a pre-recorded message in an IVR embodiment.

In step 675, the PIN reveal application 155 and the Web/IVR interface server 140 delete the decrypted PIN. The decrypted PIN can be deleted at both servers by overwriting memory used to temporarily store the decrypted PIN with random data or by any other suitable means for clearing computer memory.

In step 680, the PIN reveal application 155 determines whether to provide the account holder with another PIN character. Similar to the method 200 of FIG. 2, the account holder may request each PIN character, one at a time, until the entire PIN has been revealed via the user interface, one character at a time. Or, in the alternative, the PIN reveal application 155 may repeat steps 630-675 for each PIN character sequentially until each character is presented to the account holder, one character at a time. In another example, the PIN reveal application 155 may limit the account holder to retrieving a portion of the entire PIN only, such as the first two PIN characters, one character at a time. If another PIN character is to be provided to the account holder, the method 600 returns to step 630. Otherwise, the method 600 proceeds to step 685. In step 685, the HSM 165 deletes the PIN block, random account data, and any other information stored while performing the steps of method 600. The PIN reveal application 155 also deletes the random account data from the PIN application server 150. After step 685, the method 600 ends.

To illustrate the operation of one embodiment of this method 600, an example is provided. The example disclosed herein is not intended to limit the scope of the foregoing disclosure, and instead, is provided solely to illustrate one particular embodiment of the method 600 as the method 600 relates to one specific four character PIN. In this example, let the account holder's actual PIN be '5438' and the random account data include an card number of '4123123123123' and an expiration date of June 1965. In step 635, the HSM 165 may generate a PIN offset for this PIN and random account data of '8535'. To provide the first PIN character to the account holder, in step 645 the PIN reveal application 155 randomizes the last three characters of the PIN offset and leaves the first character unchanged. For example, this new PIN offset may be '8962' where the first offset character remains '8' while the other three offset characters are random numbers '962'. In step 655, the HSM 165 creates an encrypted PIN block using this PIN offset and random account data. In step 665, the HSM 165 decrypts the PIN block and outputs a decrypted PIN of '5897' where the first PIN character of the decrypted PIN matches the first character of the account holder's PIN while the other PIN characters are random. The PIN reveal application 670 can then provide the first PIN character to the account holder in step 670. As described above, the PIN reveal application 155 can repeat this process to provide the account holder with each other PIN character.

Figure 7:
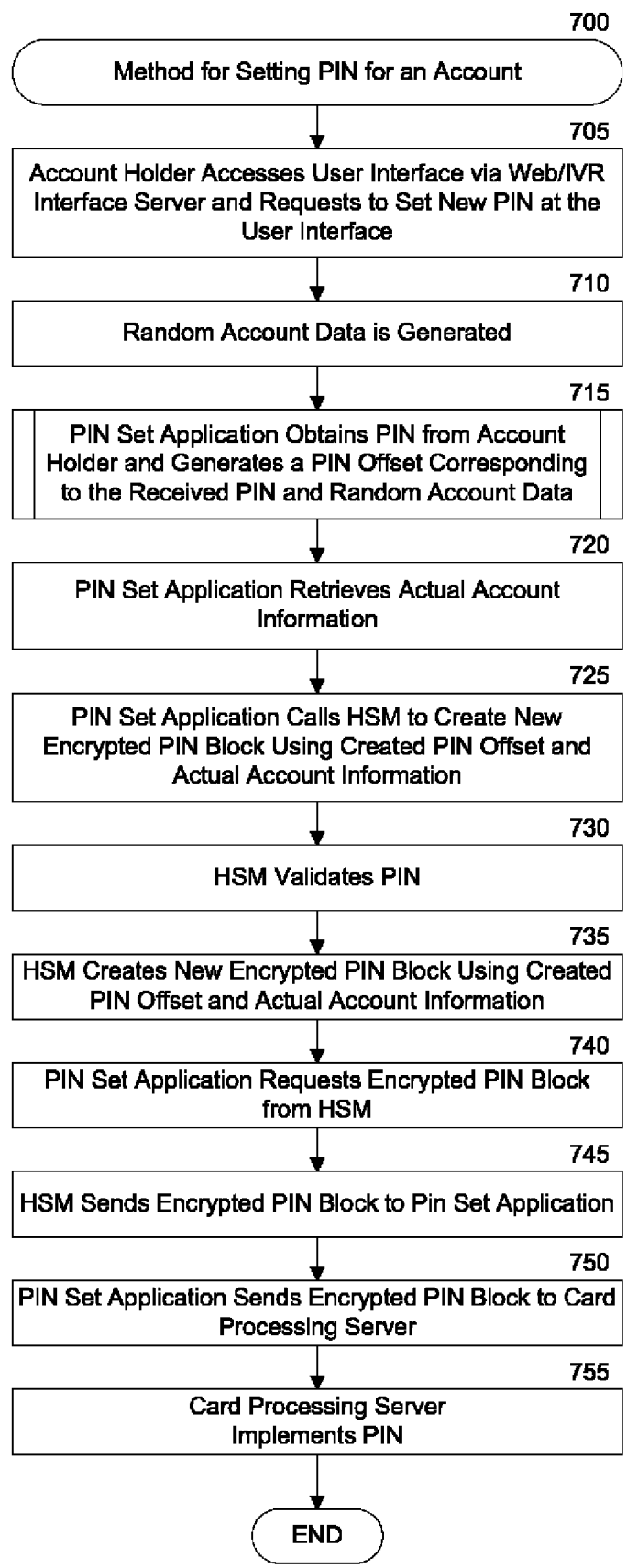
FIG. 7 is a process flow diagram depicting a method for setting a PIN for an account by the account holder in accordance with certain exemplary embodiments.

FIG. 7 is a process flow diagram depicting a method 700 for setting a PIN for an account by the account holder in accordance with certain exemplary embodiments. The method 700 is an alternative method to that of method 300 illustrated in FIG. 3 and described above. Similar to the method 600 of FIG. 6 described above, the method 700 uses conventional calls to an HSM 165 and a PIN offset masking technique. Referring to FIGS. 1 and 7, in step 705, an account holder accesses a user interface provided by the Web/IVR interface server 140 and navigates to a web page or IVR menu to set or modify a PIN associated with an account of the account holder. Step 705 can be substantially similar to that of steps 305 through 320 of FIG. 3.

In step 710, random or pseudo-random account data is generated. This random account data can include a card number, such as a sixteen digit credit card number, expiration date, and any other account data. In certain exemplary embodiments, the PIN set application 157 or another application running on the PIN application server 150 generates random account data for each session of an account holder setting or modifying their PIN. In certain alternative embodiments, the HSM 165 generates one or more sets of random account data for use by the PIN set application 157.

In step 715, the PIN set application 157 prompts the account holder for each PIN character to include in the PIN. For each PIN character, the PIN set application 157 appends random characters to the PIN character to create a complete PIN. The PIN set application 157 then makes a call to the HSM 165 to generate a PIN offset for the complete PIN using the random account data. The PIN set application 157 repeats this process for each PIN character and creates a combination PIN offset using the PIN offset character in each generated PIN offset corresponding to each non-random PIN character received from the account holder. Step 715 is described in further detail below with reference to FIG. 8.

In step 720, the PIN set application 157 retrieves actual account information associated with the account holder's account. This actual account information can include any information that is included in a PIN block, such as an account number associated with the account and a card number for a card (e.g., credit or debit card) associated with the account. The account information may be stored at the Web/IVR interface server 140. Alternatively, the account information may be stored at a card processing server 170 and the Web/IVR interface server 140 may retrieve the account information from the card processing server 170 prior to sending the account information to the PIN set application 157.

In step 725, the PIN set application 157 makes a call to the HSM 165 to create a new encrypted PIN block and sends the actual account information, created PIN offset, and random account data to the HSM 165. The HSM 165 can determine what the actual PIN is from the created PIN offset and the natural PIN of the random account data.

In step 730, the HSM 165 can validate the security strength of the PIN. That is, the HSM 165 determines if the PIN is a weak PIN or a strong PIN. This validation may be completed by comparing the received PIN to a list of PINs that are identified as "weak PINS." For example, the PIN "1-2-3-4" may be classified as "weak." The HSM 165 may then send a message to the PIN set application 157 to request that the account holder provide a new PIN. This validation step necessarily takes place before the PIN is encrypted. By having the HSM 165 perform this validation, the PIN is stored at a secure location, rather than on a server that could be vulnerable to security breaches. Step 730 can be substantially similar to that of step 360 of FIG. 3 described above. In step 735, the HSM 165 creates a new encrypted PIN block using the actual PIN determined by the HSM 165 and the actual account information.

In step 740, the PIN set application 157 requests the new encrypted PIN block from the HSM 165. In step 745, the HSM 165 sends the new encrypted PIN block to the PIN set application 157. In step 750, the PIN set application 157 sends the new encrypted PIN block to the card processing server 170 and the card processing server 170 stores the encrypted PIN block in a PIN block repository 175. In step 755, the card processing server 170 implements the new PIN contained in the received PIN block. Thus, the card processing server 170 will reference the new PIN when processing transactions involving the account. After step 755, the method 700 ends. Of course, the Web/IVR interface server 140 may continue to interact with the account holder as necessary to complete the account holder's service.

Figure 8:
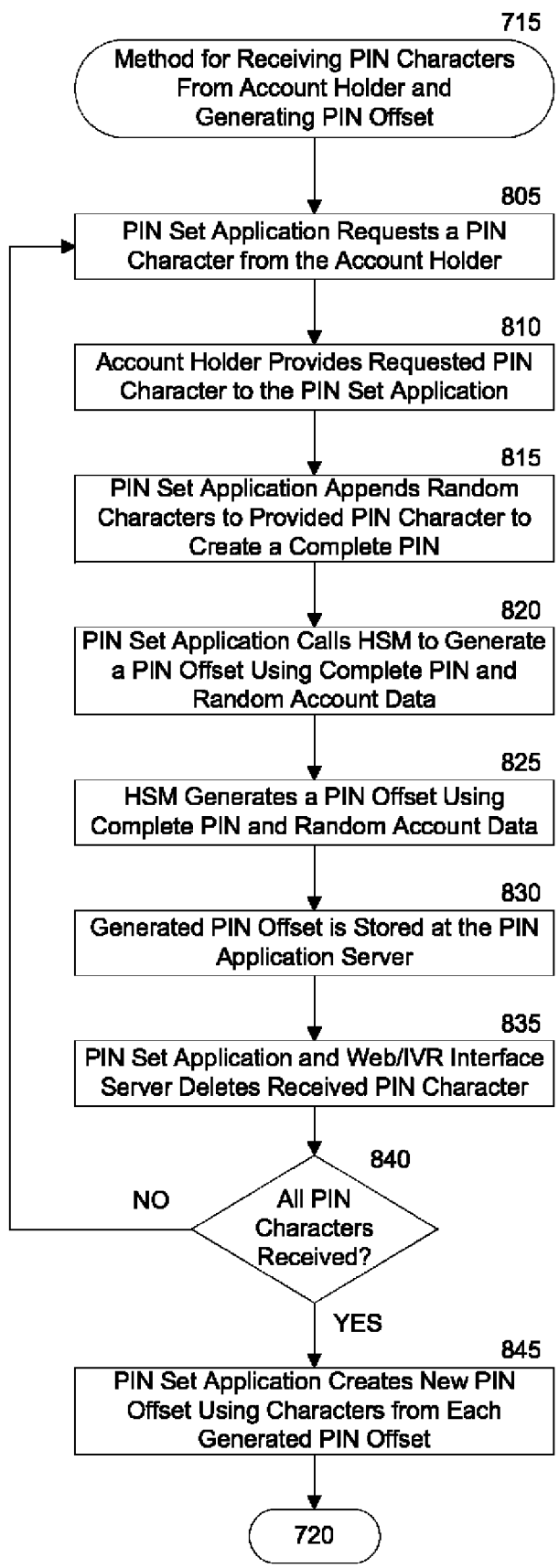
FIG. 8 is a process flow diagram depicting a method for receiving PIN characters from an account holder and generating a PIN offset in accordance with certain exemplary embodiments.

FIG. 8 is a process flow diagram depicting a method 715 for receiving PIN characters from an account holder and generating a PIN offset in accordance with certain exemplary embodiments, as referenced in step 715 of FIG. 7. Referring to FIGS. 1 and 8, in step 805, the PIN set application 157 calls the user interface of the Web/IVR interface server 140 to prompt the account holder for a PIN character. In an Internet embodiment, an Internet web site provided by the Web/IVR interface server 140 may provide a web page having a text entry box for entering a PIN character. In an IVR embodiment, an IVR application at the Web/IVR interface server 140 may prompt the account holder for a PIN character using a pre-recorded message. In certain exemplary embodiments, the PIN set application 157 requests each PIN character one at a time in order starting with the first PIN character.

In step 810, the account holder provides the PIN set application 157 with a PIN character via the user interface of the Web/IVR interface server 140. In the Internet embodiment of step 805, the account holder can enter a character into the text entry box using a keyboard coupled to the computer 110. In the IVR embodiment of step 805, the account holder can press a key on a mobile phone 105 keypad corresponding to the PIN character that the account holder selects.

In step 815, the PIN set application 157 places the received PIN character into the appropriate PIN position and appends random or pseudo-random characters to the received PIN character to create a complete PIN. For example, if the PIN includes four PIN characters and the received PIN character is the first PIN character, the PIN set application places the received PIN character into the first PIN character position and places a random PIN character into each of the second, third, and fourth PIN character positions. The PIN set application follows a similar procedure for each of the second, third, and fourth PIN characters after they are obtained from the account holder.

In step 820, the PIN set application 157 makes a call to the HSM 165 to generate a PIN offset using the complete PIN created in step 815 and random account data, such as the random account data generated in step 710 of FIG. 7. In step 825, the HSM 165 generates a PIN offset using the complete PIN created in step 815 and the random account data and sends this generated PIN offset to the PIN set application 157. In step 830, the PIN set application 157 stores the generated PIN offset at the PIN application server 150.

In step 835, the PIN set application 157 and the Web/IVR interface server 140 delete the PIN character received from the account holder. Thus, only one actual PIN character is stored at the Web/IVR interface server 140 and the PIN set application 157 at a time. The PIN character can be deleted at both servers by overwriting memory used to temporarily store the decrypted PIN with random data or by any other suitable means for clearing computer memory.

In step 840, the PIN set application 157 determines whether all of the PIN characters have been received and a corresponding PIN offset generated for each of the PIN characters. Steps 805 through 835 of the method 725 repeat until each PIN character has been received and a PIN offset is generated for each of the PIN characters. If all PIN characters have been received, the method 715 proceeds to step 845. If there are additional PIN characters that are required from the account holder, the method 715 returns to step 805 to request another PIN character.

In step 845, the PIN set application creates a new PIN offset using appropriate characters from each of the PIN offsets. For example, if the PIN includes four PIN characters, the PIN set application 157 extracts the PIN offset character in the first position of the PIN offset generated for the first PIN character and places that in the first position of the new PIN offset. Similarly, the PIN set application 157 extracts the PIN offset character in the second position of the PIN offset generated for the second PIN character and places that offset character in the second position of the new PIN offset. The PIN set application 157 extracts the PIN offset character in the third position of the PIN offset generated for the third PIN character and places that offset character in the third position of the new PIN offset. Finally, the PIN set application 157 extracts the PIN offset character in the fourth position of the PIN offset generated for the fourth PIN character and places that offset character in the fourth position of the new PIN offset. Thus, the new PIN offset includes the PIN offset corresponding to each of the received PIN characters in the appropriate PIN offset positions. After step 845, the method 715 proceeds to step 720, as referenced in FIG. 7.

To illustrate the operation of one embodiment of the method 700, an example is provided. The example disclosed herein is not intended to limit the scope of the foregoing disclosure, and instead, is provided solely to illustrate one particular embodiment of the method 700 as the method 700 relates to one specific four character PIN assembly example.

Figure 9:
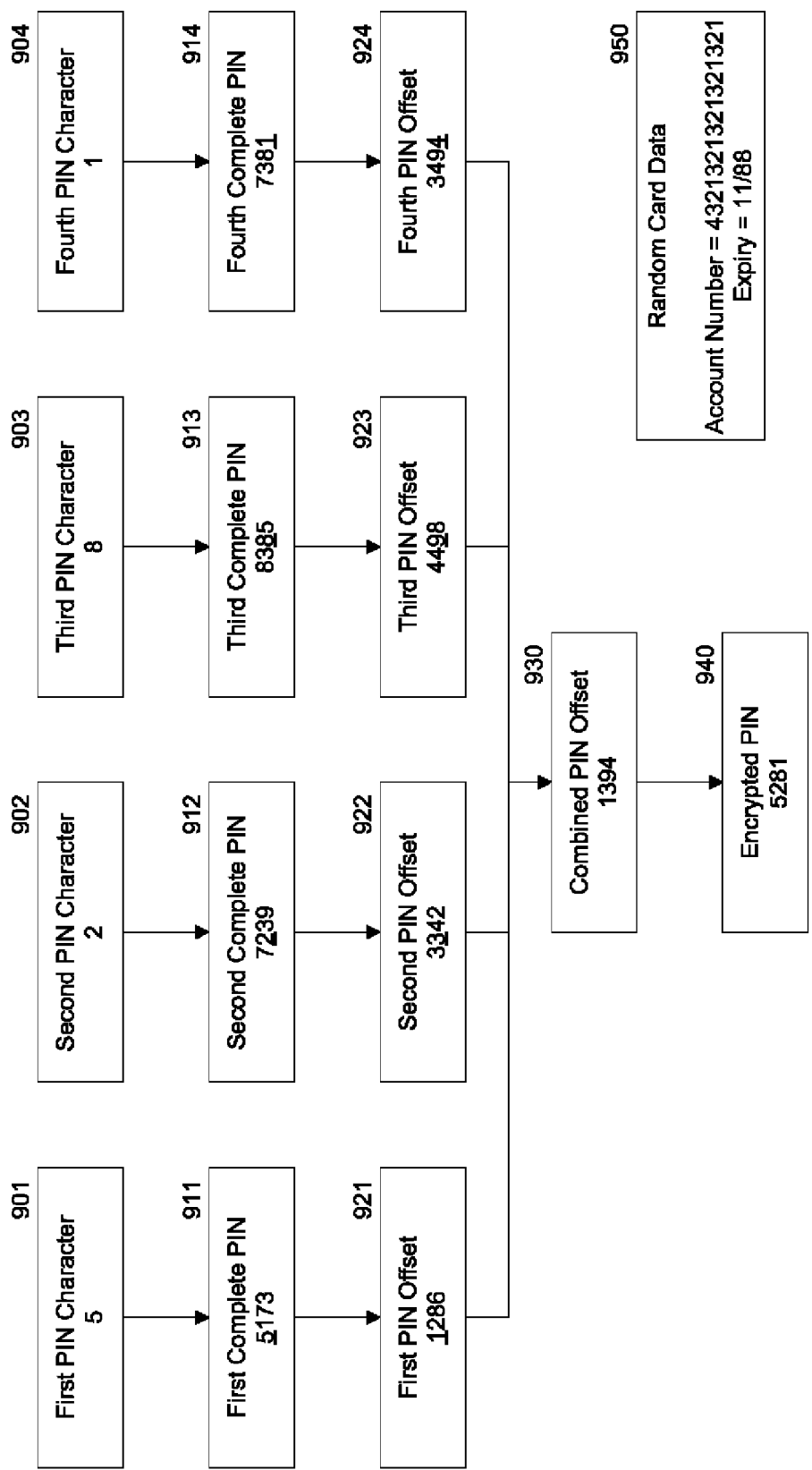
FIG. 9 is a block diagram depicting an example of the assembly of a PIN received from an account holder using the method of FIG. 7 in accordance with certain exemplary embodiments.

FIG. 9 is a block diagram depicting an example of the assembly of a PIN received from an account holder using the method 700 of FIG. 7 in accordance with certain exemplary embodiments. For simplicity of discussion, only certain steps of the method 700 are illustrated in this example. Referring to FIGS. 1, 7, 8, and 9, random account data 950 is generated in step 710. This exemplary random account data 950 includes a card number of 4321231321321321 and an expiration date of November 1988.

In step 810, the account holder provides a first PIN character 901 of '5'. In step 815, the PIN set application 157 appends three random or pseudo-random characters '1-7-3' to the second, third, and fourth PIN character positions to create a first complete PIN 911 of '5171' In step 825, the HSM 165 creates a first PIN offset 921 of '1286' using the first complete PIN 911 and the random account data 950. After the first PIN character 901 is converted to a first PIN offset 921, this first PIN offset 921 is stored at the PIN application server 150 in step 830 and the first PIN character 901 is deleted by the PIN set application 157 and the Web/IVR interface server 140.

After the first PIN character 901 is received, converted to a first PIN offset 921, and stored at the PIN application server 150, the process is repeated for the second PIN character 902. In step 810, the account holder provides the second PIN character 902 of '2'. In step 815, the PIN set application 157 appends three random or pseudo-random characters '7-3-9' to the first, third, and fourth PIN character positions to create a second complete PIN 912 of '7239'. In step 825, the HSM 165 creates a second PIN offset 922 of '1286' using the second complete PIN 912 and the random account data 950. After the second PIN character 902 is converted to a second PIN offset 922, this second PIN offset 922 is stored at the PIN application server 150 in step 830 and the second PIN character 902 is deleted by the PIN set application 157 and the Web/IVR interface server 140.

After the second PIN character 902 is received, converted to a second PIN offset 922, and stored at the PIN application server 150, the process is repeated for the third PIN character 903. In step 810, the account holder provides the third PIN character 903 of '8'. In step 815, the PIN set application 157 appends three random or pseudo-random characters '8-3-5' to the first, second, and fourth PIN character positions to create a third complete PIN 913 of '8385'. In step 825, the HSM 165 creates a third PIN offset 923 of '4498' using the third complete PIN 913 and the random account data 950. After the third PIN character 903 is converted to a third PIN offset 923, this third PIN offset 923 is stored at the PIN application server 150 in step 830 and the third PIN character 903 is deleted by the PIN set application 157 and the Web/IVR interface server 140.

After the third PIN character 903 is received, converted to a third PIN offset 923, and stored at the PIN application server 150, the process is repeated for the fourth PIN character 904. In step 810, the account holder provides the fourth PIN character 904 of '1'. In step 815, the PIN set application 157 appends three random or pseudo-random characters '7-3-8' to the first, second, and third PIN character positions respectively to create a fourth complete PIN 914 of '7381.' In step 825, the HSM 165 creates a fourth PIN offset 924 of '3494' using the fourth complete PIN 914 and the random account data 950. After the fourth PIN character 904 is converted to a fourth PIN offset 924, this fourth PIN offset 924 is stored at the PIN application server 150 in step 830 and the fourth PIN character 904 is deleted by the PIN set application 157 and the Web/IVR interface server 140.

After all of the PIN characters 901-904 are received and converted to PIN offsets 921-930, the PIN set application 157 extracts the appropriate PIN offset character from each of the PIN offsets 921-924 to assemble a combined PIN offset 930 in step 845. Specifically, the PIN set application 157 extracts the first PIN offset character of '1' from the first PIN offset 921 and places this PIN offset character in the first position in the combined PIN offset 930. Likewise, the PIN set application 157 extracts the second PIN offset character of '3' from the second PIN offset 922 and places this PIN offset character in the second position in the combined PIN offset 930. The PIN set application 157 extracts the third PIN offset character of '9' from the third PIN offset 923 and places this PIN offset character in the third position in the combined PIN offset 930. Finally, PIN set application 157 extracts the fourth PIN offset character of '4' from the fourth PIN offset 924 and places this PIN offset character in the fourth position in the combined PIN offset 930. This produces a combined PIN offset 930 of '1394'. In step 735, the HSM 165 creates a new encrypted PIN block 940 having a PIN of '5281' using the combined PIN offset 930 and the actual account information that the received PIN is associated with.

One of ordinary skill in the art would appreciate that the present invention supports systems and methods for securely disclosing a personal identification number ("PIN") associated with a financial account to an account holder and for receiving a new PIN from the account holder are provided. A PIN reveal application can interact with a hardware security module ("HSM") using a PIN offset masking process and randomly generated account data to reveal the PIN to the account holder one or more PIN characters at a time. A PIN set application also can interact the HSM using a PIN offset masking process and randomly generated account data to receive a new PIN for the account one or more PIN characters at a time. In each of the PIN reveal and PIN setting processes, less than the entirety of the PIN is stored in an unencrypted format outside of the HSM only.

The exemplary methods and steps described in the embodiments presented previously are illustrative, and, in alternative embodiments, certain steps can be performed in a different order, in parallel with one another, omitted entirely, and/or combined between different exemplary embodiments, and/or certain additional steps can be performed, without departing from the scope and spirit of the invention. Accordingly, such alternative embodiments are included in the invention described herein.

The invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A method for disclosing a personal identification number ("PIN") associated with an account, comprising:
    (a) receiving a request to disclose the PIN, the PIN comprising a plurality of PIN characters encrypted in a first PIN block;
    (b) generating account data for the account;
    (c) generating, by a processor, a PIN offset comprising a plurality of PIN offset characters using the account data and the PIN characters encrypted in the first PIN block;
    (d) modifying a portion of the PIN offset characters of the PIN offset other than one unmodified PIN offset character;
    (e) creating, by the processor, a second encrypted PIN block using the modified PIN offset and the account data;
    (f) decrypting, by the processor, the second encrypted PIN block; and
    (g) outputting a PIN character of the decrypted second PIN block corresponding to the unmodified PIN offset character of the PIN offset.

2. The method of claim 1, wherein the account data comprises a card number for a payment card associated with the account and an expiration date for the payment card.

3. The method of claim 1, wherein generating the account data comprises generating the account data randomly or pseudo-randomly.

4. The method of claim 1, further comprising repeating at least steps (d) through (g) for each PIN character of the PIN.

5. The method of claim 1, wherein outputting comprises outputting the PIN character by one of an Internet web site and an interactive voice response interface.

6. The method of claim 1, wherein generating a PIN offset comprises
    determining, by the processor, the PIN associated with the account by decrypting the PIN encrypted in the first PIN block;
    determining, by the processor, a natural PIN using the generated account data; and
    generating, by the processor, the PIN offset by determining the difference between the PIN associated with the account and the natural PIN.

7. The method of claim 1, wherein the step of modifying the portion of the PIN offset characters of the PIN offset comprises replacing each of the PIN offset characters of the portion of the PIN offset characters with one of a random character and a pseudo-random character.

8. The method of claim 1, further comprising
    repeating at least steps (e) through (h) for each PIN character of the PIN; and
    deleting any previously decrypted PIN block prior to decrypting any other PIN block.

9. A system for disclosing at least one element of a personal identification number ("PIN") associated with a transaction account, comprising:
    a user device that processes a request for disclosure of a portion of the PIN in an unencrypted form, the PIN comprising a plurality of PIN characters stored in an encrypted data element; and
    a computing device logically coupled to the user device and configured to
        receive a PIN offset and modify a first portion of the characters of the PIN offset other than one unmodified PIN offset character, to generate a modified PIN offset,
        create a second encrypted data element using the modified PIN offset and randomly generated account information,
        decrypt the second encrypted data element to generate a decrypted PIN block, and
        output a PIN character of the decrypted PIN block corresponding to the unmodified PIN offset character of the PIN offset.

10. The system of claim 9, wherein the PIN character output by the computing device comprises a single PIN character.

11. The system of claim 9, wherein the user device is configured to limit the portion of the PIN requested to a pre-defined number of PIN characters.

12. The system of claim 9, wherein the computing device is further configured to delete the decrypted PIN block after the PIN character of the decrypted PIN block is output.

13. The system of claim 9, further comprising a card processing server logically coupled to the computing device and configured to store the encrypted data element and provide the encrypted data element to the computing device upon receiving a request from the computing device.

14. The system of claim 9, wherein the user device comprises one of an Internet web browser interface and an interactive voice response interface.

15. A method for setting a personal identification number ("PIN") of an account, comprising:
    (a) receiving a PIN character of the PIN;
    (b) appending one or more PIN characters to the received PIN character to create a second PIN;
    (c) generating random account data;
    (d) creating, by a processor, a PIN offset using the second PIN and the random account data;
    (e) repeating steps (a) through (d) for each PIN character of the PIN;
    (f) creating a combined PIN offset using each of the PIN offsets created in step (d); and
    (g) creating an encrypted PIN block using information associated with the account, the random account data, and the combined PIN offset.

16. The method of claim 15, wherein creating the PIN offset comprises creating the PIN offset by the processor on a secure platform hardware security module.

17. The method of claim 15, further comprising the step of transmitting the encrypted PIN block to a card processing system for use in processing transactions.

18. The method of claim 15, further comprising validating a security strength of the PIN prior to creating the encrypted PIN block.

19. The method of claim 15, further comprising deleting any previously received PIN character prior to receiving another PIN character.

20. The method of claim 15, wherein appending the one or more PIN characters to the received PIN character comprises
    placing the received PIN character into a certain PIN position in the second PIN according to position information of the received PIN character; and
    adding one of a random and a pseudo-random character to each PIN position of the second PIN other than the certain PIN position.

21. The method of claim 15, wherein the step of creating a combined PIN offset comprises
    extracting, from each of the PIN offsets, a certain PIN offset character according to position information of the received PIN character for which the PIN offset was created; and
    placing the extracted PIN offset characters into the combined PIN offset according to the respective PIN offset positions that the PIN offset characters were extracted from.

22. The method of claim 15, wherein creating an encrypted PIN block comprises
    determining the PIN using the combined PIN offset and a natural PIN offset associated with the random account data; and
    encrypting the PIN and the information associated with the account to create the encrypted PIN block.

* * * * *